May 9, 1967 T. ADAMS 3,318,302
APPARATUS FOR THE MEASUREMENT OF PHYSIOLOGIC
EVAPORATIVE WATER LOSS
Filed Oct. 22, 1964 3 Sheets-Sheet 1

INVENTOR
THOMAS ADAMS
BY Jack A. Hill
ATTORNEY

May 9, 1967 T. ADAMS 3,318,302
APPARATUS FOR THE MEASUREMENT OF PHYSIOLOGIC
EVAPORATIVE WATER LOSS
Filed Oct. 22, 1964 3 Sheets-Sheet 2
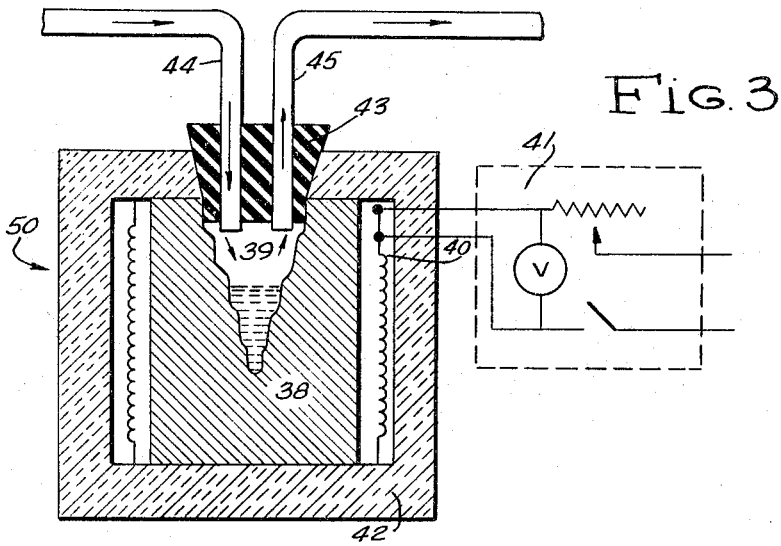
Fig. 3
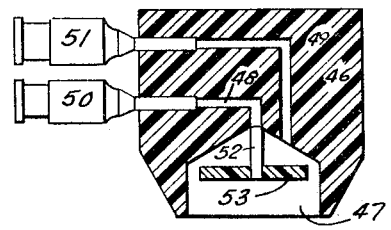
Fig. 4
Fig. 5
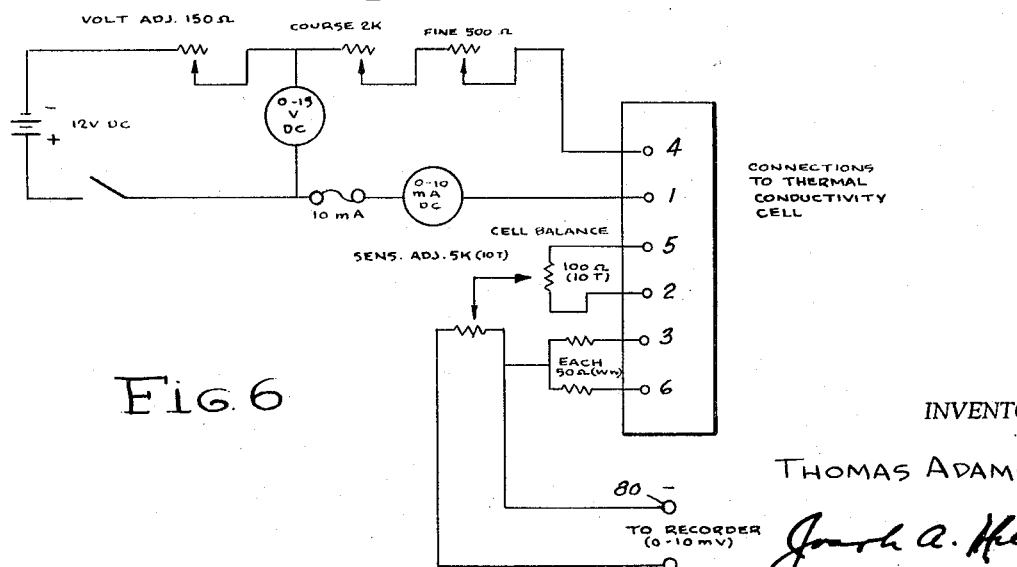
Fig. 6
INVENTOR
THOMAS ADAMS
ATTORNEY 3,318,302
APPARATUS FOR THE MEASUREMENT OF PHYSIOLOGIC EVAPORATIVE WATER LOSS
Thomas Adams, Oklahoma City, Okla., assignor to the United States of America as represented by the Secretary of the Army
Filed Oct. 22, 1964, Ser. No. 405,879
3 Claims. (Cl. 128—2)

The invention described herein may be manufactured and used by or for the Government for governmental purposes without the payment to me of any royalty thereon.

This invention relates to the measurement of physiologic evaporative water loss and more particularly relates to the determination of such loss by measuring the change in thermal conductivity of a gas sample passed over the body surface.

The precise measurement of evaporative water loss is essential to an accurate evaluation of this avenue of heat loss in acute and chronic exposure to heat. Also, in psychological studies, the quantitative measurement of sweaty, particularly palmar sweating plays an equally important role in establishing an index of emotional stress and anxiety.

A number of techniques have been used in the past to measure sweat gland activity in thermoregulatory and exercise physiology, and in experimental psychology. The most direct method, measurements of body weight changes in time, lacks the precision demanded in most studies, and is applicable only under conditions of sizable sweat production. Infra-red analyzers, resistance hygrometric elements and "coulometric cells" supply the desired sensitivity, but are too expensive or cumbersome for most applications. Experiments by the inventor have indicated that resistance hygrometric systems are adequately sensitive in response to small changes in water vapor, but are too difficult to calibrate due to a large time constant associated with the desorbtion of water from the hygroscopic mass. The characteristics of the hysteresis loops occurring in the calibration curves depended on the calibration procedures.

This invention provides a sensitive, inexpensive system for the measurement of evaporative water loss. The technique is based upon the varying thermal conductivity due to density changes caused by fluctuations in the water vapor content of air flowing through a thermal conductivity cell.

Accordingly, it is an object of this invention to provide a method and apparatus for simply and inexpensively measuring physiologic water loss.

It is another object of this invention to provide a method of determining physiologic water loss that is extremely sensitive, stable and capable of producing reproducible results.

It is another object of this invention to provide a method and apparatus for calibrating a thermal conductivity cell with controlled amounts of evaporated water.

These and other objects of the invention will be obvious from the following description with reference to the drawings wherein:

FIG. 3 is a sectional view of the controllable source of water vapor for calibration of the thermal conductivity cell;

FIG. 4 is a view, partly in section, of one embodiment of skin capsule;

FIG. 5 is a view, partly in section, of another embodiment of skin capsule;

FIG. 6 is a circuit diagram of the bridge measuring circuit showing the connections to the recorder and cell terminal block;

Figure 1:
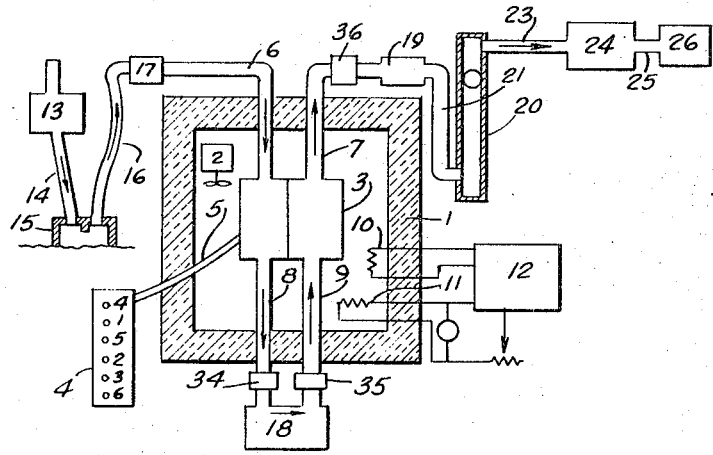
FIG. 1 is a schematic representation of one embodiment of the apparatus of the invention.
Figure 2:
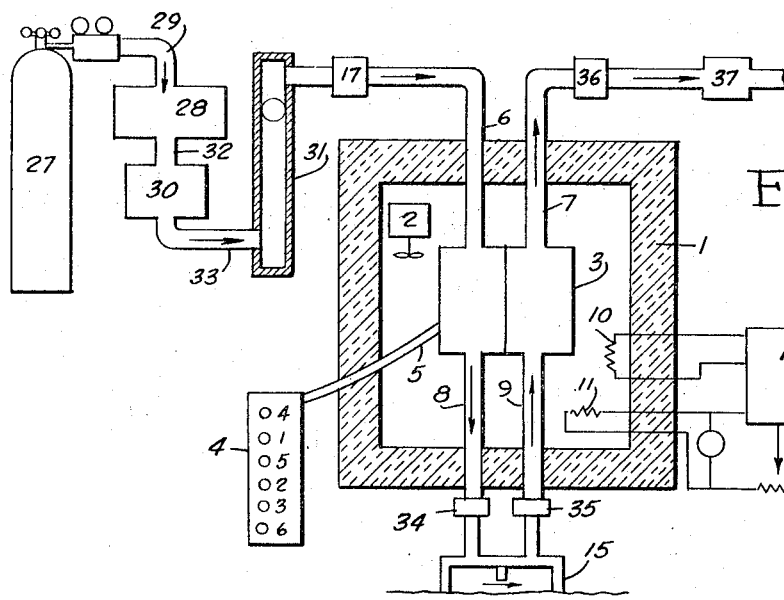
FIG. 2 is a schematic representation of another embodiment of the apparatus of the invention.

With reference to FIGS. 1 and 2 the apparatus consists of an insulated housing 1 containing a fan 2 and a thermal conductivity cell 3. The specific cell used was a model 9677 thermal conductivity cell manufactured by the GOW-MAC Instrument Co., which cell is supplied with terminal block 4, numbered as shown, for connection to a bridge measuring circuit. Other cells can, of course, be used. The specific cell used is sold as a unit comprising the cell 3, connecting cable 5 and terminal block 4. The internal structure of the thermal conductivity cell is not shown since such cells are known to the art and the structure of the cell forms no part of the instant invention. Four conduits 6, 7, 8, and 9 extend through the insulation and are connected to the thermal conductivity cell to provide a flow of gas through both sides of the cell. Since it is essential that a constant temperature be maintained within the insulated housing, a temperature sensing element 10 and a heater element 11 are mounted within insulated housing 1 and are connected to a suitable temperature controller shown schematically at 12. The specific control means used was a thermoregulator with a set point at 50° C., Cat. No. 55260 manufactured by the Chicago Apparatus Co., 1827 McGee St., Kansas City 8, Mo.

The terminal block 4 is connected to a suitable bridge measuring circuit such as is shown in FIG. 6 and imbalance as measured on a suitable recorder connected to the bridge circuit at points 80 and 90. The recorder used herein was a Varian Graphic Model G–14. The circuit shown is a slight modification of the measuring circuit suggested by the cell manufacture which also could be used.

The process can be carried out using either room air as in FIG. 1 or compressed gas as in FIG. 2 but in both cases the basic cell assembly, housing and circuitry are the same. The type of gas source used controls the arrangement of the ancillary equipment.

Referring now to FIG. 1, the structure used when room air is the source is shown. Room air enters a drying unit 13 filled with Drierite or other suitable dehydrating agent. The drying unit 13 is connected through tubing 14 to the skin capsule 15 which will be described in detail below. Tubing 16 connects capsule 15 to conduit 6 by means of a releasable tubing connector 17. Conduit 8 is connected by tubing connector 34 to drying unit 18, which is also filled with material similar to that in drying unit 13. Conduit 9 is connected to drying unit 18 by connector 35. Conduit 7 is connected by tubing connector 36 to an adjustable needle valve 19 which is in communication with a flow meter 20 through tubing 21. Flow meter 20 is connected to tubing 23 which leads into a chamber 24 connected to pump 26 by tubing 25. The function of chamber 24 is to provide a large air capacitance in series with the pump to clamp any minor flow or pressure fluctuation. The direction of flow through the apparatus is shown by the arrows.

With reference now to FIG. 2 a source of compressed air 27 is connected to a flow regulator 28 by tubing 29. A drying unit 30 is connected between flow regulator 28 and flow meter 31 by tubing 32 and 33. Flow meter 31 is connected to conduit 6 by tubing connector 17. Conduits 8 and 9 are connected to skin capsule 15 by connectors 34 and 35. For calibration purposes tubing connector 36 connects conduit 7 to calibration units 37, containing a weighed amount of dehydrating agent. In use in a test connector 36 is vented to the atmosphere.

To initially calibrate the cell, as will be explained more fully below, it is necessary to obtain several different, constant rates of water evaporation. A calibrating unit for obtaining such rates is shown generally in FIG. 3 as 50. The unit 50 consists of a brass block 38 having a stepped cavity 39 extending inwardly from the surface thereof. The number of steps should be approximately 4 or 5 to provide for adequate calibration. The hole may be made by boring the smallest diameter hole to the desired depth and then overboring with successively larger drills to produce the configuration shown in FIG. 3. Although brass was the material used it is not critical and any thermal conductor such as copper or aluminum or even iron, for example, could be used.

A heater element 40 surrounds the block and is connected to suitable control means shown schematically at 41 for maintaining constant controllable temperatures within the block 38. The whole assembly is enclosed by insulation 42 having an opening aligned with the cavity 39. A two holed stopper 43 containing tubes 44 and 45 seals the whole assembly.

Two different embodiments of the skin capsules 15 shown generally in FIGS. 1 and 2 are illustrated in FIGS. 4 and 5. Referring now to FIG. 4, one embodiment comprises a plastic block having cavity 47 extending inwardly from one face thereof. Two holes 48 and 49 are provided each extending from a face of the block 46 to the cavity 47. Needle hubs 50 and 51 are pressed into the exterior ends of each of the holes 50 and 51 and a length of tubing 52 carrying baffle plate 53 is pressed into the interior portion of hole 48. In practice the gas stream will flow from hub 50 into cavity 47, around baffle plate 53 and out hub 51. This capsule design has been found useful in measuring evaporative loss from skin areas approximately 1 cm.² confined within the area of cavity 47. In such cases the block has been roughly cubic approximately 2 cm. on an edge with the baffle plate located approximately 2 mm. above the lower face.

For measuring smaller skin areas the device of FIG. 5 has been useful. It consists of a plastic plate 46 having a T-fitting 47 extending through and mounted tightly in a hole in the plate 46. A needle hub 48 is soldered into the upper end of the T-fitting 47 with the shank portion 49 of hub 48 terminating slightly above the lower end of the T-fitting 47. By using a T-fitting of approximately 5 mm. diameter small areas of the body can be tested by taping the plastic plate to the skin. Air flows in through the needle hub and out through the leg of the T after passing over the skin surface confined by lower end of the T-fitting 47.

Calibration procedure

In order to translate the readings of cell imbalance obtained from the recorder into experimentally meaningful results in terms of mgm. of water/min. it is necessary to first calibrate the thermal conductivity cell. To do this three requirements must be met. A source of dry air is required, a controllable source of evaporating water is necessary and means are required to determine the amount of water evaporated during a given time. To accomplish this the device shown in FIG. 3 is inserted in the gas circuits of FIGS. 1 and 2 in place of capsule 15. Carefully weighed containers of a dehydrating agent such as Drierite are placed in the circuit as shown in FIG. 2 or in place of drying unit 18 of FIG. 1. Before the calibration is to be made the needle valve 19 of FIG. 1 or the flow regulator 28 of FIG. 2 are adjusted to maintain a constant air flow of approximately 200 cc./min. The cavity 39 in calibration unit 50 is filled with water to the top of one of the vertical portions of the stepped cavity 39 and the unit is brought to a predetermined temperature and inserted in the circuit. Carefully weighed samples of Drierite of approximately 50 gms. are inserted in the circuits at 18 and 37 and the apparatus is permitted to run for a prescribed time interval of for example, 5 minutes.

The constant reading of the recorder is noted and the samples are weighed to determine the amount of water absorbed during the time interval. This procedure is repeated at different temperatures of unit 50 and with the water at the various levels within the stepped cavity 39.

Figure 7:
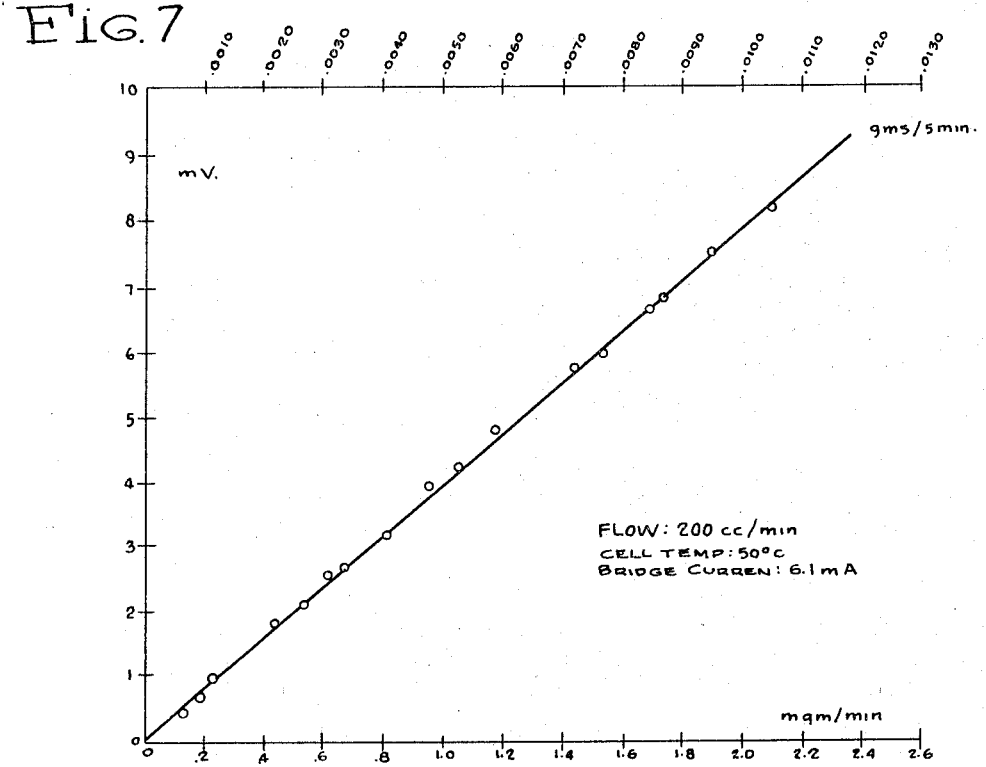
FIG. 7 is a calibration curve for the thermal conductivity cell.

FIG. 7 represents a calibration curve obtained by plotting the multivolt readings of bridge imbalance obtained from the recorder against the rate of water evaporation determined by weighing of the samples. Bridge imbalance is shown as a function of the rate of water vapor production at a bridge sensitivity setting of 4500 ohms. Increased or decreased cell sensitivity would allow for measurements of other ranges of rates of water vapor production, with the upper limit being defined by the saturation of air at the ambient temperature in which the unit is operated. The calibration points for this curve were obtained on different days, reproducing operating values of the system at each different test.

The plot is a straight line making the conversion from millivolts to mgm. water/min. quite simple and the recorder paper may be directly labled in terms of mgm./min. Since the system is shown to respond to very small rates of water vapor production, it is of course, important that fresh Drierite be used in each drying cylinder. Calibration bottles were weighed to the nearest 0.1 mgm. No changes in the calibration curve were noted on successive days of measurement, a characteristic not shared by an infrared analyzer technique.

To facilitate the calibration of the device it has been found helpful to have the calibration bottles containing Drierite connected in parallel around drying unit 18 of FIG. 1 with suitable valves provided so that the air flow can be rapidly switched from drying unit 18 to the calibration bottles.

Likewise a two way valve with a vent line can be invested in FIG. 2 between connector 36 and calibration bottle 37 to switch flow of gas from atmospheric vent to the calibration bottle 37.

Latency and time constant of response of the unit depends on the size of the sampling capsule, the length and diameter of the tubing connecting to the cell, and the air flow rate through the system. For example using the capsule of FIG. 4 having a cavity 47 approximately 2 cm. in diameter and 1.5 cm. high for sampling and approximately 60 cm. of PE 240 tubing with an air flow rate of 200 cc./min., resulted in a response latency and time constant in the order of 2 seconds and 10 seconds respectively; using the smaller capsules shown in FIG. 5 shortened these characteristics considerably. In any combination of these factors, these characteristics can be determined empirically and records appropriately interpreted.

Two examples of the physiologic applications of the technique will now be given.

Example 1

Figure 9:
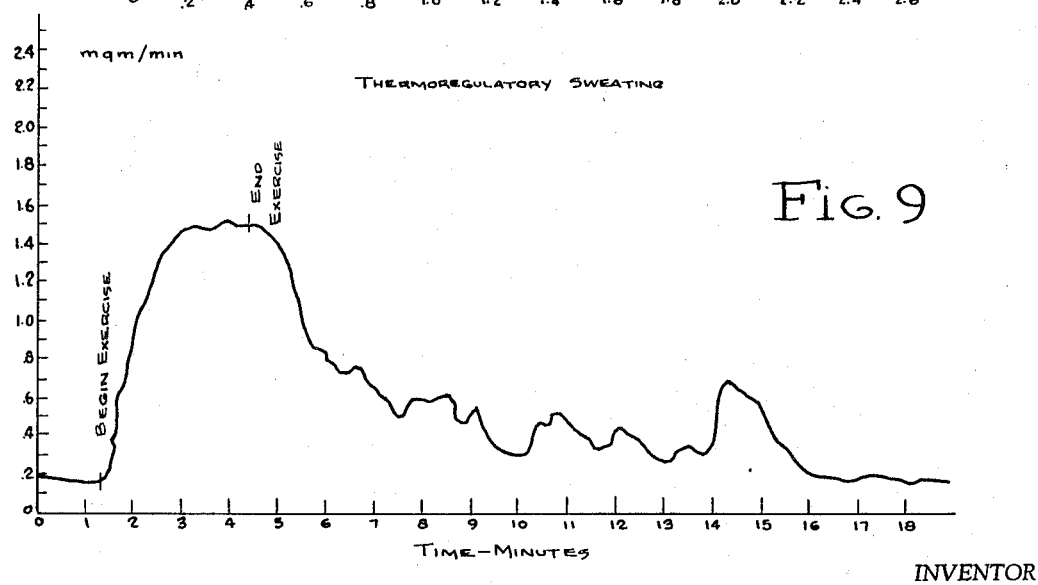
FIG. 9 is a tracing of thermoregulatory sweating obtained by the invention.

The cell was calibrated as set forth above. The plastic capsule of FIG. 4 was connected to the fluid circuit as described and taped to the lateral surface of a subject's forearm. A constant gas flow of 200 cc./min. was obtained and the recorder was actuated. The subject ran in place for approximately 3½ minutes and tracings from the recorder indicated the change in thermoregulatory sweating throughout the test period from rest through exercise and back to rest. The tracing obtained is shown in FIG. 9.

Example 2

Figure 8:
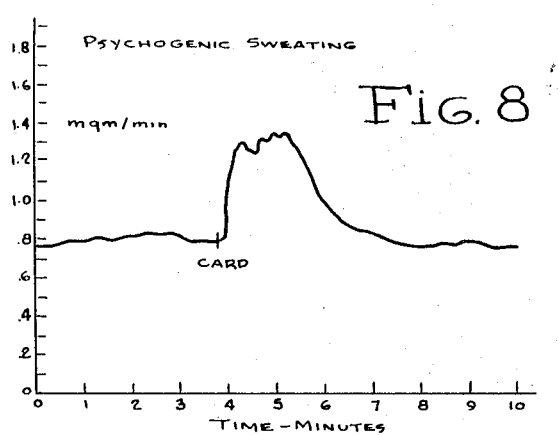
FIG. 8 is a tracing of psychogenic sweating obtained by the invention.

The cell was calibrated as in Example 1. The test capsule of FIG. 5 was inserted in the fluid circuit and taped to the palm of the subject's hand. A constant gas flow of 200 cc./min. was obtained and the recorder actuated. After a period of time the subject was shown a card carrying a profane word. The tracing of psychogenic sweating obtained is shown in FIG. 8.

Three types of information are obtainable from these records: (1) instantaneous rate (ordinate), (2) acceleration (slope of tracing at any part of the curve), of water vapor production, and (3) total amount of water produced (area under curve for any time interval).

The rate of flow of air at 200 cc./min. is in itself not critical. However, it is essential that the air flow rate be high enough to insure complete evaporation of sweat from the area being tested. This rate combined with the step of drying room air (or air from the compressed air tank) before it is presented to the skin provides a reproducible sample for the reference side of the cell and further insures complete evaporation of sweat by providing a steep vapor pressure gradient.

This invention has been described with respect to a specific embodiment thereof. Many minor modifications within the scope and spirit of the invention will readily occur to those skilled in the art. The scope of the invention therefore is not limited to the specific embodiment but is defined in the following claims.

I claim:
1. Apparatus for measurement of physiologic evaporative water loss comprising:
 (a) An insulated housing enclosing a thermal conductivity cell, air circulating means, heat supply and thermal sensing means;
 (b) a capsule member having an inlet and an outlet, said capsule member including a body portion having a cavity therein, the cavity communicating with said inlet and outlet and opening downwardly to enclose a test surface, said inlet extending downwardly into said cavity;
 (c) a plurality of conduits passing through said insulated housing and connected to said thermal conductivity cell;
 (d) air supply means including dehydrating means connected through said capsule member to a first pair of said plurality of conduits connected to said thermal conductivity cell, the inlet of said capsule member directing dehydrated air to a test surface, the outlet connected to the first pair of said plurality of conduits for exhausting humid air from said capsule member into said cell;
 (e) a second pair of said plurality of conduits connected through a dehydrating means to said first pair of conduits and directing dehydrated air through said thermal conductivity cell, said second pair of conduits connected through a flow meter sequentially to a pressure damping and pump means;
 (f) terminal connector means connected to said thermal conductivity cell for applying the output of said thermal conductivity cell to a bridge circuit; and
 (g) recording means connected to the output of said bridge circuit.

2. Apparatus as recited in claim 1 wherein said capsule member comprises:
 (a) a solid block of material having a cavity in one face thereof;
 (b) inlet and outlet bores extending between said cavity and a face of said block and terminating in coupling means projecting beyond the face of said block;
 (c) conduit means extending from said inlet bore into said cavity; and
 (d) baffle means surrounding the outlet end of said conduit means.

3. Apparatus as recited in claim 1 wherein the body portion of said capsule member comprises:
 (a) a flat plate member having an aperture therein;
 (b) a hollow cylindrical member having a conduit piercing the cylinder wall and extending normally thereof;
 (c) said cylindrical member press fitted into the aperture of said flat plate; and the inlet comprises a conduit coupling means projecting into said cylindrical member at an end adjacent said conduit and extending beyond said latter end.

References Cited by the Examiner

UNITED STATES PATENTS

| 1,981,172 | 11/1934 | Harrison | 73—27 |
| 2,594,163 | 4/1952 | Hayworth | 73—29 |
| 3,139,085 | 6/1964 | Custance et al. | 128—2 |

FOREIGN PATENTS

| 929,936 | 7/1955 | Germany. |

OTHER REFERENCES

Type 26–303, Portable Moisture Monitor, Consolidated Electrodynamics Corporation, 1961 (copy in class 73, subclass 29, group 430).

RICHARD A. GAUDET, *Primary Examiner.*

ROBERT E. MORGAN, *Examiner.*

K. L. HOWELL, *Assistant Examiner.*